US009049398B1

(12) United States Patent
Moscovich et al.

(10) Patent No.: US 9,049,398 B1
(45) Date of Patent: Jun. 2, 2015

(54) SYNCHRONIZING PHYSICAL AND ELECTRONIC COPIES OF MEDIA USING ELECTRONIC BOOKMARKS

(75) Inventors: Tomer Moscovich, San Francisco, CA (US); Tiffany Yun, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 13/433,156

(22) Filed: Mar. 28, 2012

(51) Int. Cl.
*H04N 1/40* (2006.01)
*G06F 3/041* (2006.01)

(52) U.S. Cl.
CPC .......................................... *H04N 1/40* (2013.01)

(58) Field of Classification Search
None
See application file for complete search history.

(56) References Cited

U.S. PATENT DOCUMENTS

| | | | |
|---|---|---|---|
| 6,725,281 B1 * | 4/2004 | Zintel et al. | 719/318 |
| 7,069,518 B2 * | 6/2006 | Card et al. | 715/776 |
| 7,313,656 B1 * | 12/2007 | Harvey | 711/137 |
| 8,156,115 B1 * | 4/2012 | Erol et al. | 707/728 |
| 8,564,621 B2 * | 10/2013 | Branson et al. | 345/632 |
| 2011/0292077 A1 * | 12/2011 | Lapstun et al. | 345/632 |
| 2012/0260163 A1 * | 10/2012 | Kim et al. | 715/273 |

OTHER PUBLICATIONS

Miyata, et al., "Document Area Identification for Extending Books without Markers", ACM, Conference on Human Factors in Computing Systems (CHI), Session: Books & Language, Vancouver, BC, Canada, May 7-12, 2011, pp. 3189-3198.

* cited by examiner

*Primary Examiner* — Steven Kau
(74) *Attorney, Agent, or Firm* — Lee & Hayes, PLLC

(57) ABSTRACT

Described herein are techniques for synchronizing reading locations of electronic copies of a print medium with page numbers associated with physical copies of the print medium. A page number is derived from an image of a page of a physical copy of the print medium, and the image is captured by an electronic bookmark or electronic device in proximity to the physical copy of the print medium. The page number or image is provided to a synchronization service which synchronizes the page number with one or more reading locations or other page numbers.

24 Claims, 12 Drawing Sheets

SYNCHRONIZING PHYSICAL AND ELECTRONIC COPIES OF MEDIA USING ELECTRONIC BOOKMARKS

BACKGROUND

Increasingly, books, magazines, and newspapers are consumed in electronic form. Readers will view these print media on a myriad of devices, including electronic reading (or "e-reading") devices, smart phones, tablet computers, and other electronic devices. Often, a reader is able to have electronic copies of a same print medium on multiple devices belonging to the reader, removing the need to carry a single device to varying locations. For electronic devices able to connect to each other or to a network, synchronization to a furthest read page or a most recently viewed page between the multiple electronic copies may be available. Thus, a user may read to a certain page on one device, synchronize another device to that page, and pick up reading on that page on the other device.

Often, readers will have a physical copy of a print medium that corresponds to their electronic copies. For example, a reader may have bought a physical copy of a book and, subsequently, purchased an electronic version of that book. The reader may have purchased both the physical and electronic copies with the intention of reading the print medium partially in each of the copies. The inconvenience of switching between a physical copy of a print medium and electronic copies of the print medium may cause the reader to surrender this goal, however. There is no way to automatically reflect progress in reading the physical copy by synchronizing the electronic copies, or visa-versa.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1A:
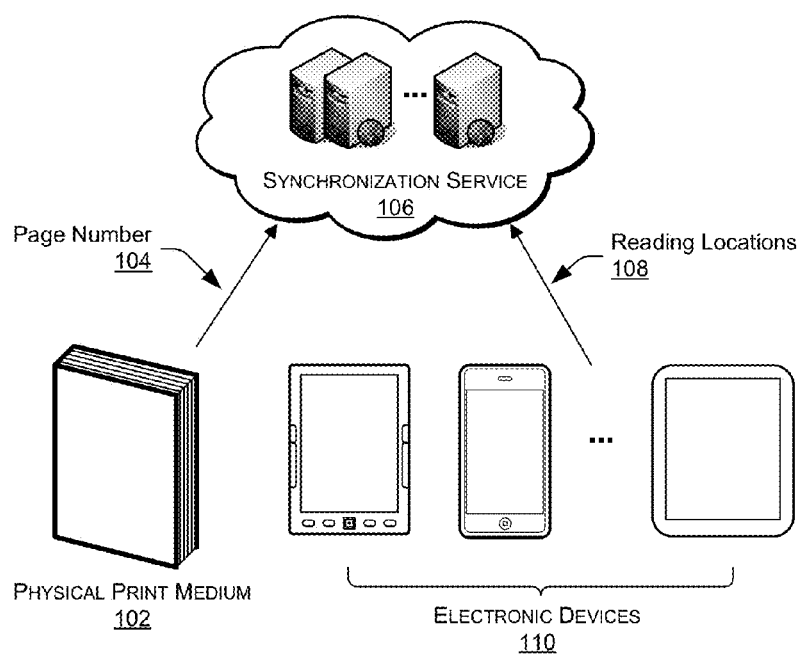
FIGS. 1a-1b illustrate an example overview of synchronizing physical and electronic copies of a print medium.

This disclosure is directed, in part, to techniques for synchronizing one or more reading locations of one or more electronic copies of a print medium with a page number associated with a physical copy of the print medium. For instance, a synchronization service may receive the page number from an electronic bookmark or other electronic device that is in proximity to the physical copy of the print medium. The electronic bookmark or electronic device may capture an image of a page of the physical copy of the print medium and may derive the page number from the image. As used herein, the phrase "image of a page" refers to an image of any part or parts of a page, contiguous or non-contiguous, including simply an image of a part of a word or image, or an image of an entire page.

In other embodiments, the synchronization service receives the captured image and derives the page number from the image. The synchronization service may synchronize the page number and reading locations to a furthest read page or a most recently viewed page, and provide the result of the synchronization as a synchronization page suggestion to one or more of the electronic bookmark, the electronic device, other electronic devices of the user associated with the print medium, or electronic bookmarks or electronic devices of contacts of the user associated with the print medium.

In further embodiments, the synchronization service receives a reading location associated with an electronic copy of the print medium from an electronic device. Upon receiving the reading location, the synchronization service determines if it has previously received or derived a page number of a physical copy of the print medium. The physical copy may be associated with a same user as the electronic copy or with a contact of the user of the electronic copy. The synchronization service may synchronize the page number and reading locations to a furthest read page or a most recently viewed page, and provide the result of the synchronization as a synchronization page suggestion to an electronic bookmark or electronic device from which the page number or an image of the page was received, as well as to the electronic device that provided the reading location. In some embodiments, the synchronization service may not have previously received or derived a page number of a physical copy of the print medium. In such embodiments, the synchronization service may provide a page number mapped to the received reading location to an electronic bookmark or electronic device that is proximate to the physical copy of the print medium. In one embodiment, the mapped page number is provided responsive to a request from the electronic bookmark or electronic device that is proximate to the physical copy of the print medium, the request being initiated responsive to, e.g., a user opening the physical copy of the print medium.

In some embodiments, the page number is derived from the image of the page based on a set of print media associated with the user, based on a reading history of the user, or based on general or user-specific patterns. For example, the user may only have electronic copies of ten different print media, may only have been reading three of these recently, and most users, in general, read a book in a single direction, from the first page to the last. This information may be used to reduce the possible pages searched over when deriving the page number.

In various embodiments, the device or service performing the deriving extracts indicia (e.g., textual or visual patterns) from the image of the page and compares those extracted indicia with indicia associated with reading locations in electronic copies of print media (e.g., all ten print media or simply reading locations in electronic copies of the three recently read print media). As used herein, the term "reading location" may refer to a page in a physical copy of a print medium or to an index in some other division of the print medium that is used in the electronic copy of the print medium. For example, the reading location may be indexed to a byte count so that the reference number is invariant if changes are made to the font, line spacing, etc. of the electronic copy of the print medium. In the latter case, the reading location indices may be mapped to page numbers of the physical copy of the print medium. Based on the comparison, the device or service may determine the image to be associated with a reading location in an electronic copy of a print medium. If the reading location is different from a page number, the device or service may consult the above-mentioned mappings to determine a page number in a physical copy of the print medium that corresponded to the reading location in the electronic copy.

In other embodiments, the comparison might not find a page number in the indicia mappings. This could be the case when, for example, a user's electronic bookmark captures an image of a page of a physical copy of a print medium that the user has no electronic copy of, such as a library book. In such embodiments, the synchronizations service may utilize a master set of indicia mappings containing indicia associated with pages of all print media known to the synchronization service or a subset of such indicia mappings.

Figure 1B:
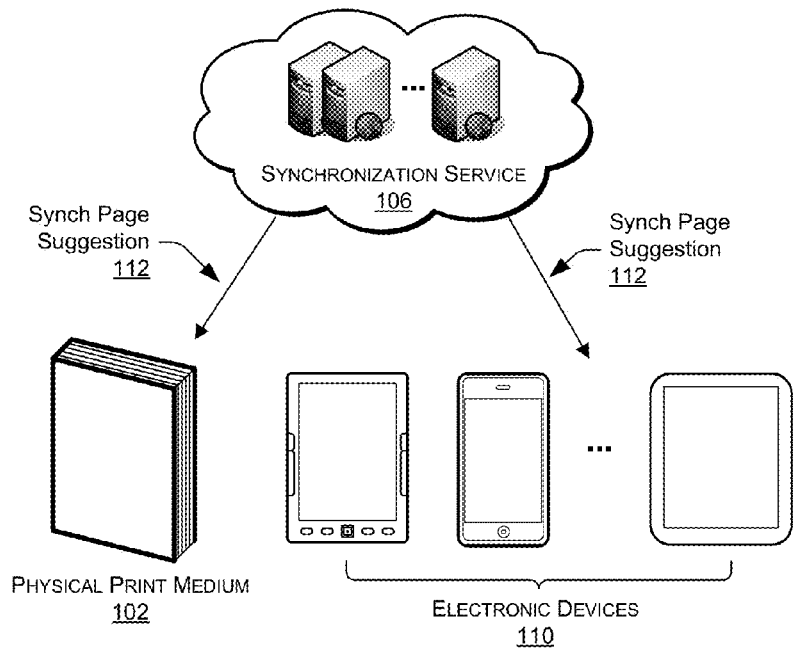

FIGS. 1a-1b illustrate an example overview of synchronizing physical and electronic copies of a print medium. As illustrated in FIG. 1a, a physical copy of a print medium 102 may have its current page number 104 provided to a synchronization service 106 for synchronization with reading locations 108 associated with electronic copies of the print medium provided to the synchronization service 106 by electronic devices 110.

The physical copy of the print medium 102 may be a physical copy of any sort of print medium. For example, the physical copy of the print medium 102 may be a physical book, a physical magazine, a physical newspaper, or physical copy of a personal document belonging to the user of the electronic bookmark or electronic device, or to a contact or social network friend of the user. The physical copy of the print medium 102 may include images, text, or both, and may include some sort of binding or cover.

A user may read the physical copy of the print medium 102 up until a specific page number, and that specific page number may be provided to the synchronization service 106 as the page number 104. To obtain the page number 104, a user may place an electronic bookmark or other electronic device 110 in proximity to the physical copy of the print medium 102 and capture an image of a current page. For example, the electronic bookmark may be placed on the page and capture the image responsive to some event, such as the closing of the physical copy of the print medium 102, the actuation of a control on the electronic bookmark, motion of the electronic bookmark, opening of the physical copy of the print medium 102, or any change in the environment of the physical bookmark. The electronic bookmark may then derive the page number 104 from the image and provide the page number 104 either directly to the synchronization service 106, or indirectly through an electronic device 110. When providing indirectly through an electronic device 110, the electronic bookmark may provide the page number 104 through an electronic device 110 of the same user as the electronic bookmark or through an electronic device 110 of a contact or social network friend of that user. In other embodiments, the electronic bookmark or electronic device 110 may provide a captured image of the page associated with the page number 104 in place of the page number 104, enabling the synchronization service 106 to derive the page number 104 from the image. Example electronic bookmarks and electronic devices 110, and processes of these bookmarks and devices 110, are illustrated in greater detail in FIGS. 5-9 and are described further below with reference to those figures.

The synchronization service 106 receives the page number 104 or image of the page and associates the page number 104 or image with a user account based on which electronic bookmark or electronic device 110 the page number 104 or image was received from. If receiving an image, the synchronization service 106 may then derive the page number 104 from the image. The synchronization service 106 may also receive the reading locations 108 from the electronic devices 110 prior to, concurrently with, or subsequent to receiving the page number 104 or image. The synchronization service 106 also associates the reading locations 108 with a user account based on the electronic device 110 that they are received from. The synchronization service 106 may then compare the page number 104 and reading locations 108 to determine either a furthest read page or a most recently viewed page. This comparison may be initiated either in response to receiving a page number 104 or a reading location 108. The synchronization service 106 may compare page numbers 104 and reading locations 108 for a same user account or across accounts of users connected in some way, such as contacts or friends on a social network. In the latter case, one user may have his or her page number or reading location updated to reflect a page number or reading location of a contact or friend.

FIG. 1b illustrates the synchronization service 106 providing synchronization page suggestions 112 for the physical copy of the print medium 102 and for the electronic copies of the print medium stored on the electronic devices 110. The synchronization service 106 determines the synchronization page suggestion 112 based on the comparison of the page number 104 and reading locations 108, and the synchronization page suggestion 112 may represent the furthest read page or most recently viewed page.

The synchronization service 106 may provide the synchronization page suggestion 112 for the physical copy of the print medium 102 by providing the synchronization page suggestion 112 to the electronic bookmark or electronic device 110 that provided the page number 104 or image. The electronic bookmark or electronic device 110 may then render the synchronization page suggestion 112 using, for example, display or audio. The user of the electronic bookmark or electronic device 110 may then flip to a page in the physical copy of the print medium 102 that corresponds to the synchronization page suggestion 112. In some embodiments, the synchronization page suggestion 112 is provided in response to a request from the electronic bookmark or electronic device 110, the request being generated responsive to an event such as the opening of the physical copy of the print medium.

In some embodiments, in addition to providing a synchronization page suggestion 110, the synchronization service 106 may provide a purchase suggestion. For example, if the synchronization service 106 receives an image of a page or a page number 104 of a physical copy of a print medium, and the user associated with that physical copy does not own a corresponding electronic copy, the synchronization service 106 may provide a suggestion that the user purchase the electronic copy. Such a suggestion, which may include a price and even a mechanism for initiating a purchase, may be rendered by the electronic bookmark or electronic device 110 from which the image of a page or a page number 104 was received.

The synchronization service 106 may also provide the synchronization page suggestion 112 to the electronic devices 110 having the electronic copies of the print medium. Upon receiving the synchronization page suggestion 112, the electronic devices 110 may either automatically update current reading locations based on the synchronization page suggestion 112 or may render the synchronization page suggestion 112 to a user to enable the user to choose whether or not to update the current reading location. In some embodiments, the synchronization page suggestion 112 is only provided to the electronic devices 110 having the electronic copies of the print medium responsive to requests for the synchronization page suggestion 112.

Example Synchronization Service Architecture and Processes

Figure 2:
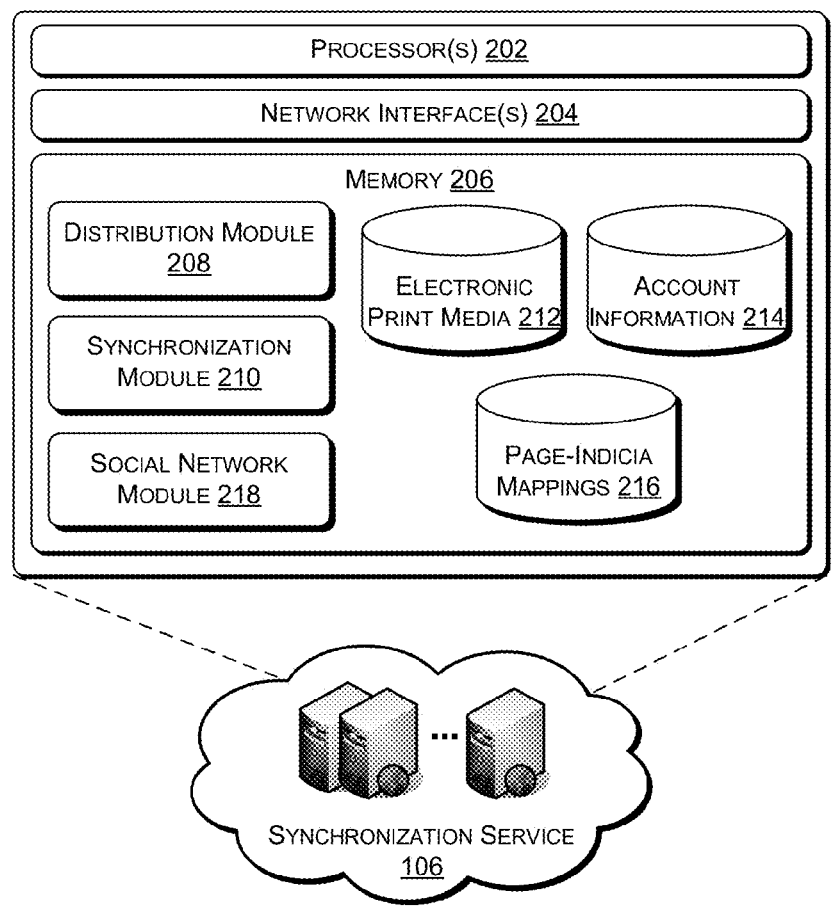
FIG. 2 illustrates an example synchronization service architecture. The synchronization service includes modules for synchronizing reading locations of electronic copies of a print medium with a page number of a physical copy of the print medium.

FIG. 2 illustrates an example synchronization service architecture. The synchronization service includes modules for synchronizing reading locations of electronic copies of a print medium with a page number of a physical copy of the print medium. As illustrated, one or more devices comprising a synchronization service 106 include processor(s) 202, network interface(s) 204, and memory 206. The memory 206 in turn includes a distribution module 208, a synchronization module 210, electronic print media 212, account information 214, page-indicia mappings 216, and a social network module 218.

In various embodiments, the synchronization service 106 is implemented on one or more computing devices, and the computing devices may each be any sort of computing device or computing devices. For example, the computing device(s) of the synchronization service 106 may each be or include a server or server farm, multiple, distributed server farms, a mainframe, a work station, a personal computer (PC), a laptop computer, or any other sort of device or devices. In one implementation, the computing device(s) of the synchronization service 106 represent a plurality of computing devices working in communication, such as a cloud computing network of nodes. When implemented on multiple computing devices, the synchronization service 106 may distribute the modules and data 208-218 of the synchronization service 106 among the multiple computing devices. In some implementations, one or more of the computing device(s) of the synchronization service 106 represents one or more virtual machines implemented on one or more computing devices.

In some embodiments, the processor(s) 202 may be or include any sort of processing unit, such as a central processing unit (CPU) or a graphic processing unit (GPU). The network interface(s) 204 allow the device(s) of the synchronization service 106 to communicate with electronic devices 110, electronic bookmarks or other devices. The network interface(s) 204 may send and receive communications through wired networks, wireless networks, and combinations of wired and wireless networks. Further, the network(s) may include any one or combination of multiple different types of public or private networks (e.g., cable networks, the Internet, wireless networks, etc.). In some instances, the device(s) of the synchronization service 106 communicate over the network using a secure protocol (e.g., https).

The memory 206 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 206 includes a distribution module 208. The distribution module 208 may be any application, process, thread, or function configured to distribute electronic copies of print media. For example, a user may purchase an electronic copy of a print medium, and a notation may be made of the purchase in the account information 214. In some embodiments, the distribution module 208 may retrieve a list of all electronic devices 110 associated with the purchasing user from the account information 214, may retrieve the purchased electronic copy of the print medium from the electronic print media 212, and may provided the retrieved electronic copy to the electronic devices 110. In other embodiments, the distribution module 208 instead awaits requests electronic devices 110 of the purchasing user. The request may specify the purchased electronic copy of the print medium or may generally request any electronic copies of print media associated with the user that are not stored on the requesting electronic device 110. Upon receiving the request, the distribution module 208 authenticates the request with the account information 214, retrieves the electronic copies of print media from the electronic print media 212, and provides the requests electronic copies of print media.

Figure 3:
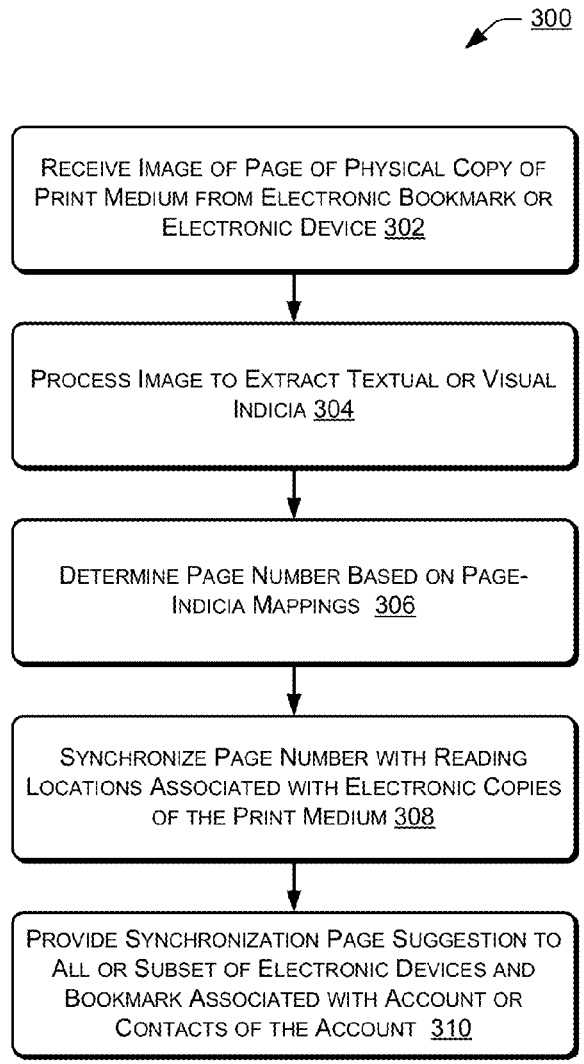
FIG. 3 illustrates an example process in which the synchronization service receives an image of a page of the physical copy of the print medium, derives a page number from the image, and performs the synchronization using the derived page number.
Figure 4A:
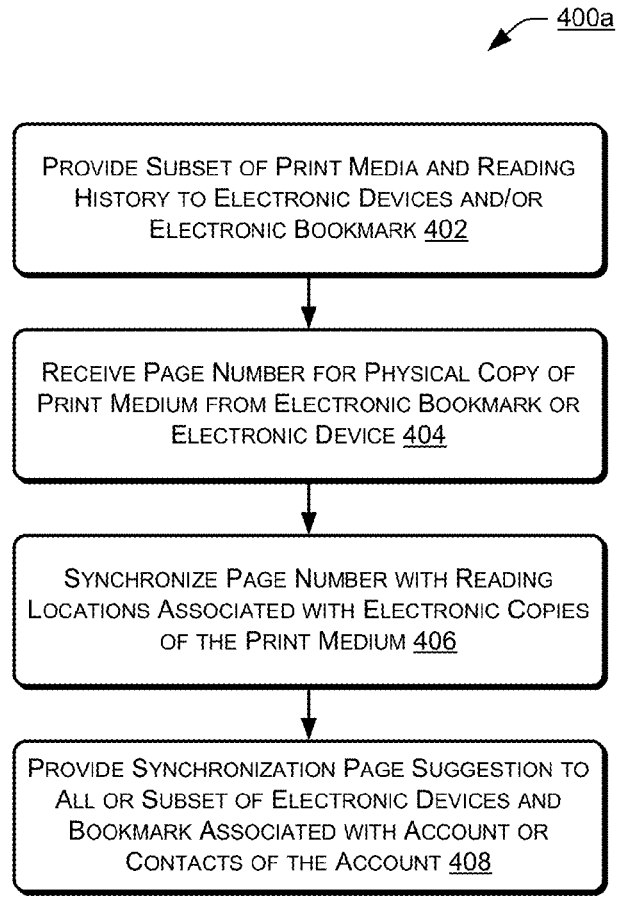
FIGS. 4a-4b illustrate example processes in which the synchronization service receives a page number from an electronic bookmark or an electronic device or a reading location from an electronic device and performs the synchronization using the received page number or reading location.
Figure 4B:
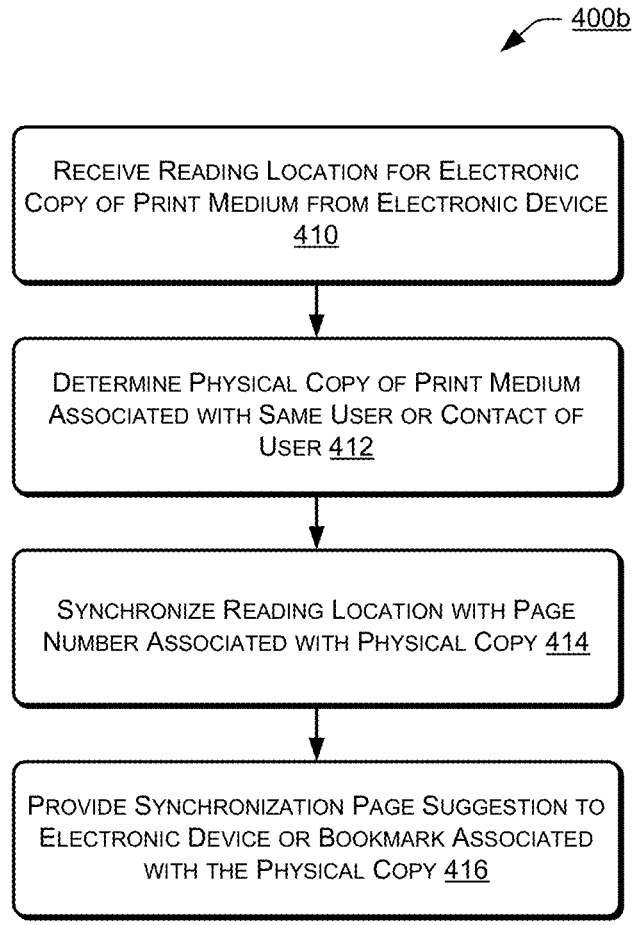

In various embodiments, the synchronization module 210 may be any application, process, thread, or function configured to receive page numbers 104 and reading locations, compare those page numbers 104 and reading locations 108 to determine synchronization page suggestions 112, and provide those synchronization page suggestions 112. The synchronization module 210 may also derive page numbers 104 from received images of pages. Further, the synchronization module 210 may construct a reading history for a user or a contact/social network friend of the user from reading locations 108 and page numbers 104 and may use the reading history in deriving page numbers 104 from images or may provide the reading history to electronic devices 110 or electronic bookmarks to enable them to derive page numbers 104 from images. These operations of the synchronization module 210 are illustrated in FIGS. 3 and 4a-4b and are described in greater detail below with reference to those figures.

In some embodiments, the synchronization module 210 may be configured to provide purchase suggestions to electronic bookmarks and electronic devices. If the received page number 104 or image of the page is determined to be from a physical copy of a print medium and the user of the physical copy is determined not to have an electronic copy of the print medium, the synchronization module 210 may provide a purchase suggestion that includes information about the electronic copy, such as price, and a mechanism enabling purchase of the electronic copy.

Electronic print media 212 may be any one or more repositories of electronic copies of print media 212 and may be stored in association with the synchronization service 106 (as shown) or may be stored by a separate service of a same or affiliated entity.

Account information 214 may be any one or more repositories storing information associated with users. For example, a user may be represented by an account identifier in the account information 214, and each account identifier may be associated with identifiers of one or more electronic devices 110 or electronic bookmarks of the user or identifiers of user profiles on shared electronic bookmarks or shared electronic device 110, identifiers of one or more electronic print media purchased or otherwise acquired by the user, information indicating which of the user's electronic devices 110 have electronic copies of which electronic print media, and further information indicating reading locations associated with electronic copies of electronic print media. Also, each account identifier may be associated with identifiers of friends or social network contacts of the user. Additionally, the account information 214 may associate an indication of whether the user owning an electronic print medium also owns a corresponding physical copy of the print medium 102 and may store a current page number in association with that indication.

In various embodiments, the page-indicia mappings 216 include representative textual and visual indicia associated with each reading location of each electronic print medium. For example, one reading location may be associated with a unique combination of textual phrases or images extracted from the reading location. Examples of such indicia and their uses are discussed in Akihiro Miyata and Ko Fujimura, "Document Area Identification for Extending Books without Marker," CHI 2011, May 7-12, 2011, Vancouver, BC, Canada, pgs. 3189-3198 (hereinafter, "Miyata et al."). In Miyata et al., for example, a set of alphanumeric keys read backwards from a text may be taken to represent a page. In addition to the indicia associated with each reading location, the page-indicia mappings 216 may include mappings between reading locations and pages when the reading locations differ from the page numbering used in physical copies of print media 102.

In some embodiments, the synchronization service 106 includes a social network module 218 that is configured to publish received page numbers 104 and reading locations 108 to a social network account associated with the user from which the page numbers 104 and reading locations 108 are received. In one embodiment, the social network module 218 may also calculate a rate at which the user reads physical copies of print media and another rate at which the user reads electronic copies of print media and may publish the rates to the social network account.

In further embodiments, the memory 206 also includes a page-indicia mapping service for creating page-indicia mappings 216 for personal documents. The page-indicia mapping service may utilize the techniques described in Miyata et al. to generate the page-indicia mappings 216.

FIGS. 3 and 4a-4b illustrate example processes 300, 400a, and 400b of operations of the synchronization service 106. These processes 300, 400a, and 400b are described as a sequence of operations. It is to be appreciated, however, that the processes 300, 400a, and 400b are merely representative example implementations, and more or fewer operations may be performed by the same or different entities in different implementations. Further, the processes 300, 400a, and 400b can be implemented in hardware, software, or a combination thereof. For example, the processes 300, 400a, and 400b may be implemented at least partially by the synchronization module 210 described above. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 300 includes, at 302, includes receiving an image of a page of a physical copy of a print medium 102 from an electronic device 110 or electronic bookmark. The image may be received though the network interface(s) 204 of the synchronization service 106.

At 304, the image of the page is processed to extract textual or visual indicia. For example, the synchronization service 106 implementing process 300 may utilize Object Content Recognition (OCR) technology for recognizing text in images or any other techniques known in the art for extracting pictures or text from images. In one embodiment, the indicia may comprise sets of alphanumeric keys read backwards, as described in the above-cited Miyata et al.

At 306, the extracted textual or visual indicia are used to determine a page number associated with the image of the page. For example, the synchronization service 106 implementing process 300 may reference indicia associated with reading locations and page numbers, such as the page-indicia mappings 216. Because the page-indicia mappings 216 may include indicia associated with multiple reading locations/pages of each of a very large set of electronic print media, the matching process may be time consuming.

In some embodiments, to shorten this matching process, the process 300 may determine a set of electronic print media associated with the user whose device provided the image of the page and/or with contacts or social network friends of the user. The process 300 may also determine print media recently read by that user, the contacts, and/or the friends. Such a list of electronic print media and a reading history can be obtained from, for example, account information 214. Upon obtaining the list or history, the process 300 may determine a subset of page-indicia mappings 216 associated with the list or history, and may attempt to match the extracted indicia against indicia associated with the subset.

In a further embodiment, the process 300 may utilize general or user-specific patterns, such as the general pattern of a user reading a book in a single direction, from front to back, to further shorten the matching process. When obtaining the list of electronic print media associated with the user, the contacts, and/or the friends and the reading history, the process 300 may also obtain the reading location for each book in the list or history. The process 300 may then further reduce the subset of page-indicia mappings 216 to focus on indicia of reading locations/pages that are proximate to or subsequent to current reading locations.

In yet further embodiments, the process 300 may, upon failing to find a match in the subset of page-indicia mapping 216, utilize the full set of page-indicia mappings 216 or some larger subset.

At 308, the process 300 synchronizes the determined page number of the physical copy of the print medium with reading locations of electronic copies of the same print medium. These reading locations may be obtained from account information 214. The synchronization service 106 implementing the process 300 may receive the reading locations from time to time or on a predetermined basis and may store those reading locations in the account information 214. The reading locations retrieved from account information may include one or both of reading locations associated with the user or reading locations associated with contacts or social network friends of the user. In an alternate embodiment, upon determining the page number, the process determines electronic devices 110 of the user, contacts of the user, and/or social network friends of the user that have electronic copies of the print medium and retrieves reading locations associated with those electronic copies. Once the page number and reading locations are retrieved, the process 300 determines the furthest read page or the most recently viewed page. For the later, times associated with the reading locations and with the page image reception may be used. The furthest read page or most recently viewed page is then determined by the process 300 to be the synchronization page suggestion.

At 310, the process 300 provides the synchronization page suggestion to all or a subset of the electronic devices 110 having electronic copies of the print medium and to the electronic device 110 or electronic bookmark that captured the image of the page of the physical copy of the print medium. In some embodiments, the automatic provisioning of the synchronization page suggestion may be based on preferences associated with the various devices.

In process 400a, rather then receiving an image of a page, the synchronization service 106 implementing the process 400a receives a page number. At 402, prior to receiving the page number, the process 400 provides at least one of a list of electronic print media associated with a user or a user's contacts/friends or a reading history associated with a user or the user's contacts friends to electronic devices 110 associated with the user or an electronic bookmark associated with the user. The process 400 may do so automatically or in response to a request. The process 400 may further provide a subset of page-indicia mappings 216 based on the list or history.

At block 404, the process 400 receives a page number from an electronic device 110 or electronic bookmark. The page number may have been determined at least in part based on the list, history, and subset of page-indicia mappings 216.

At blocks 406 and 408, the process 400 synchronizes the page number with reading locations to determine synchronization page suggestions and provides the synchronization page suggestions to all or a subset of a user's devices. The operations shown at blocks 406 and 408 are the same as those shown in blocks 306 and 308 and described above.

In process 400b, at block 410, the synchronization service 106 may receive a reading location for an electronic copy of a print medium from an electronic device 110. Upon receiving the reading location, the synchronization service 106 may determine, at block 412, whether any physical copies of the print medium are associated with a user of the electronic device 110 or with a contact or social network friend of the user. Such a determination may be made with reference to account information 214.

At block 414, the synchronization service 106 may synchronize the reading location with page number(s) of any determined physical copies of the print medium. The operation shown at block 414 is the same as those shown in blocks 308 and 406 and described above.

At block 416, the synchronization service 106 may provide a synchronization page suggestion based on the synchronization to electronic bookmarks or electronic devices 110 associated with the determined physical copies. These associated electronic bookmarks or electronic devices 110 may be the electronic bookmarks or electronic devices 110 that previously provided page numbers or images of pages of the physical copies of the print medium. In some embodiments, the synchronization service 106 provides the synchronization page suggestion responsive to requests from the electronic bookmarks or electronic devices 110 for the synchronization page suggestion.

Example Electronic Bookmark Architecture and Process

Figure 5:
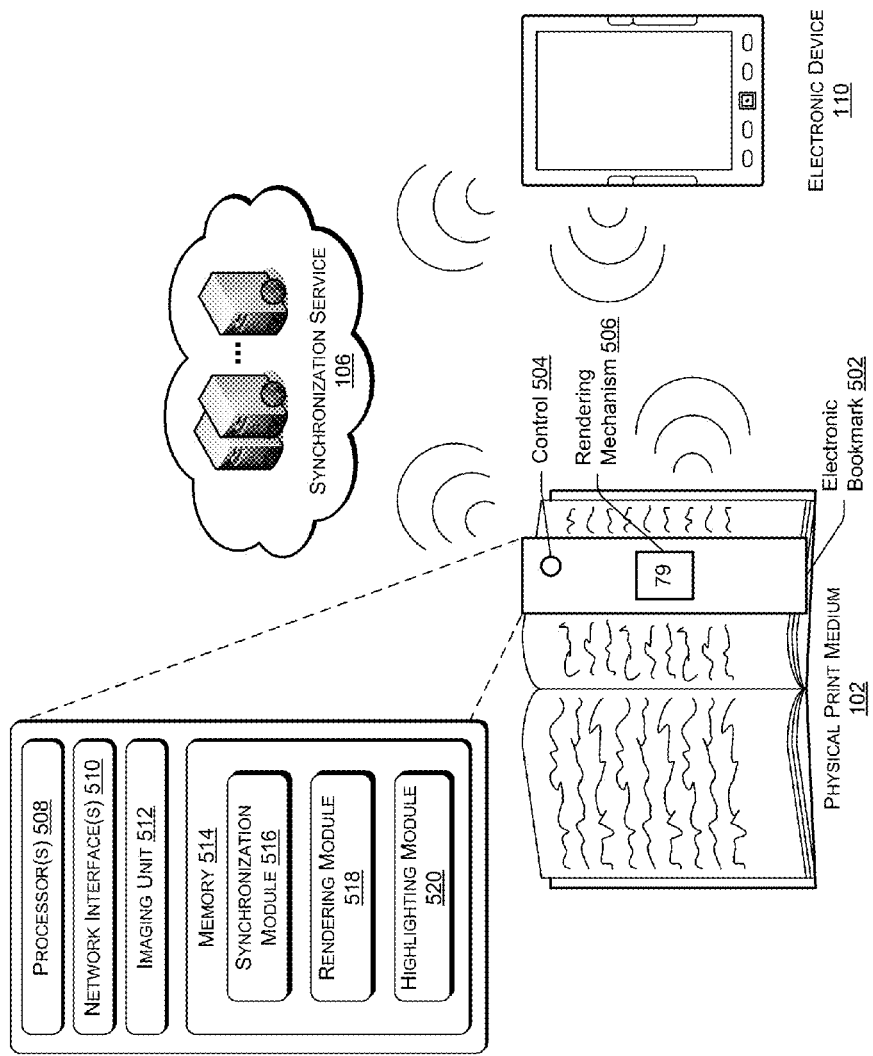
FIG. 5 illustrates an example environment including the synchronization service, a physical copy of a print medium, an electronic bookmark, and an electronic device, as well as an architecture of the electronic bookmark.

FIG. 5 illustrates an example environment including the synchronization service, a physical copy of a print medium, an electronic bookmark, and an electronic device, as well as an architecture of the electronic bookmark. As illustrated, an electronic bookmark 502 is placed on a physical page of a physical copy of a print medium 102. The electronic bookmark 502 captures an image of the page responsive, for example, to the closing of the physical copy of the print medium 102 or to actuation of a control 504, which may be disposed on the electronic bookmark 502. The electronic bookmark 502 may then provide either a page number it has derived from the image or may provide the image itself to the synchronization service 106 through, for example, a satellite-provided wireless network connection. In other embodiments, the electronic bookmark 502 provides the page number or image to a proximate electronic device 110 for optional processing and subsequent transmission to the synchronization service 106. The proximate electronic device 110 may belong to a same user as the electronic bookmark 502 or to a contact or social network friend of the user of the electronic bookmark 502. The processing optionally performed by the electronic device 110 may include deriving the page number from the received image. Responsive to receiving a page number or page image, the synchronization service 106 provides a synchronization page suggestion 112 determined in the manner described above. The electronic bookmark 502 may receive the synchronization page suggestion 112 directly from the synchronization service 106 or indirectly through a proximate electronic device 110. Also, in some embodiments, the electronic bookmark 502 does not receive the synchronization page suggestion 112 until it requests it responsive to a triggering event, such as the opening of the physical copy of the print medium. Upon receiving the synchronization page suggestion 112, the electronic bookmark utilizes a rendering mechanism 506 to render the synchronization page suggestion 112 using display, audio, or both. In other embodiments, the electronic bookmark 502 may not include a rendering mechanism 506, and the electronic device 110 may instead render the synchronization page suggestion 112. The rendering of the synchronization page suggestion 112 may enable a user of the physical copy of the print medium 102 to flip to a page corresponding to the synchronization page suggestion 112.

In various embodiments, the electronic bookmark 502 is an electronic device having a bookmark form factor. In other words, the body of the electronic bookmark 502 is designed to be flat and relatively thin so as to fit between pages of physical copies of print media 102 when those physical copies are closed or folded. The form factor may also be relatively long or wide to protrude from a side of the closed/folded physical copy of the print medium 102 to visually indicate to the user where the electronic bookmark 502 is located. The body of the electronic bookmark 502 may be made of any material, such as a plastic or polymer.

In some embodiments, control 504 may be a button, touch sensitive surface, light sensor, or other mechanism having mechanical and/or electrical components. Responsive to actuation (which may include touching the control 504 or occluding light), the logic associated with the control 504 transmits a signal to the synchronization module 516 to cause the imaging unit 512 to capture an image of a page.

In various embodiments, rendering mechanism 506 may be a display surface, such as liquid crystal display (LCD), a light-emitting diode (LED) display, an electronic paper display, or any other type of display or combination of displays. Rendering mechanism 506 may also be a set of audio speakers. The rendering mechanism 506 receives data to render from the rendering module 518 and renders the received data.

As shown in FIG. 5, the electronic bookmark 502 may include processor(s) 508, network interface(s) 510, an imaging unit 512, and a memory 514. The memory 514 includes a synchronization module 516, a rendering module 518, and a highlighting module 520.

In some embodiments, the processor(s) 508 may be or include any sort of processing unit, such as a central processing unit (CPU) or a graphic processing unit (GPU). The network interface(s) 510 allow the electronic bookmark 502 to communicate with electronic devices 110, the synchronization service 106, or other devices. The network interface(s) 510 may send and receive communications through wired networks, wireless networks, and combinations of wired and wireless networks, and may, for example, utilize cellular, WiFi, radio-frequency identification (RFID), and near filed communication (NFC) techniques. Further, the network(s) may include any one or combination of multiple different types of public or private networks (e.g., cable networks, the Internet, wireless networks, etc.). In some instances, the electronic bookmark 502 communicates over the network using a secure protocol (e.g., https).

In some embodiments, the imaging unit 512 comprises any type of optics or camera capable of capturing an image of a page. The imaging unit 512 may utilizes folded optics, light pipes, or other image capturing mechanisms suitable for the bookmark form factor of the electronic bookmark 502. In various embodiments, the image captured by the imaging unit 512 may be a low resolution image.

The memory 514 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 514 includes a synchronization module 516. The synchronization module 516 may be any one or more applications, processes, threads, or functions configured to cause the imaging unit 512 to capture an image and to provide, via the network interface(s) 510, that image to the synchronization service 106 directly or through an electronic device 110. In some embodiments, the synchronization module 516 causes the imaging unit 512 to capture the page image responsive to receiving an indication that the control 504 has been actuated, that the physical copy of the print medium has been closed/folded. In other embodiments, the synchronization module 516 causes the imaging unit 512 to capture the page image responsive to a change in the directional orientation of the electronic bookmark 502 to a vertical position (i.e., where the length of the electronic bookmark 502 is perpendicular to lines of text). Also, in some embodiments, the synchronization module 516 derives a page number 104 from the image and provides the page number 104 rather than the image. Further, the synchronization module 516 may receive from the synchronization service 106, either directly or through an electronic device 110, a synchronization page suggestion 112 and may provide the synchronization page suggestion 112 to the rendering module 518 for rendering. Additionally, the synchronization module 516 may request a synchronization page suggestion 112 from the synchronization service 106 responsive to a triggering event, such as opening the physical copy of the print medium 102, and may receive and render the requested synchronization page suggestion 112. These capabilities of the synchronization module 516 are illustrated in the operations shown in FIGS. 6*a*-6*b* and are described further below with reference to that figure.

In some embodiments, the rendering module 518 may be any one or more applications, processes, threads, or functions configured to receive data to render, such as a synchronization page suggestion 112, and to provide that data to the rendering mechanism 506 for rendering. The rendering module 518 may provide the synchronization page suggestion 112 as a page number or may provide a direction based on the page number, such as "turn ahead two pages" or "turn left." In addition to receiving and rendering the synchronization page suggestion 112, the rendering module 518 may receive and render the above-described purchase suggestions.

In further embodiments, the rendering module 518 may be configured to provide a last page read for a physical copy of a print medium 102 to the rendering mechanism 506 for rendering. For example, a user may place the electronic bookmark 506 on a physical copy of a print medium 102 and, upon identifying the physical copy of the print medium 102, the rendering module 518 may retrieve the last read page associated with that physical copy of a print medium 102 from memory 514 and provide it to the rendering mechanism 506. The physical copy of the print medium 102 may be identified by capturing an image of the cover of the physical copy of the print medium 102, or of a specific page. In some embodiments, after retrieving the last read page, the retrieving module 518 may invoke the synchronization module 516 to determine a synchronization page suggestion 112 for the print medium and may provide that synchronization page suggestion 112 to the rendering mechanism 506 in place of the last read page.

In various embodiments, the electronic bookmark 502 includes a highlighting module 520 to capture an image of text or graphics from a page of a physical copy of a print medium 102 for highlighting. The highlighting module 520 may be any one or more applications, processes, threads, or functions configured to capture an image using the imaging unit 512 responsive to a highlighting input signal. The highlighting input signal may be a rotation of the electronic bookmark 502 to a horizontal position (i.e., where the length of the electronic bookmark 502 is parallel to lines of text), an actuation of control 504 when in a horizontal position, or an actuation of an additional control. The highlighting module 520 may then provide the image to the synchronization service 106 or another service along with an indication that the image includes highlighted text. The synchronization service 106 or other service may then extract the highlighted text and associate it with a user account.

In further embodiments, the electronic bookmark 502 may be equipped with sensors along an edge of the electronic bookmark 502 to detect a movement of a user's finger or stylus along the edge. This detected movement data may be provided along with the captured image by the highlighting module to the synchronization service 106. By providing both an image and movement data, the exact words or images highlighted may be identified by the synchronization service 106 (or in some embodiments, by the electronic bookmark 502 or electronic device 110). The synchronization service 106 may then identify those words as highlighted words, enabling electronic devices 110 to show the words as being highlighted in electronic copies of the print medium.

In addition to modules 516-510, the memory 514 may also include electronic print media associated with the user of the electronic bookmark 502, a reading history of the user, and a subset of page-indicia mappings 216 associated with the electronic print media. These media, history, and mappings may be used by the synchronization module 516 if deriving a page number 104 from the captured image.

Figure 6A:
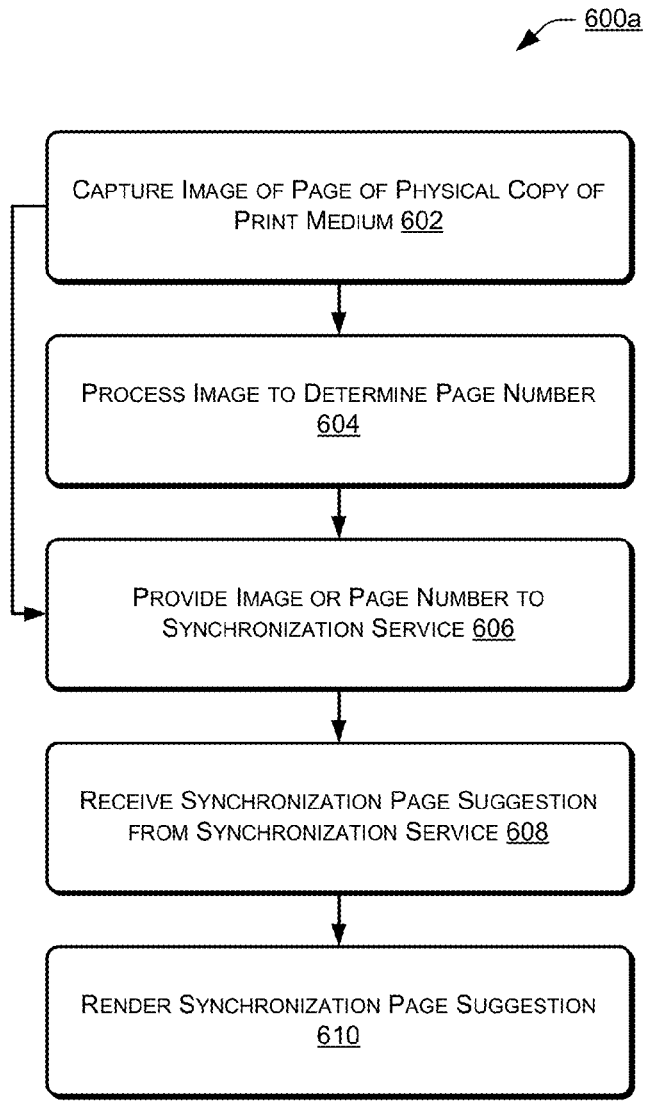
FIGS. 6a-6b illustrate example processes in which an electronic bookmark captures an image of a page of a physical copy of a print medium and provides the image to a synchronization service and in which the electronic bookmark requests a synchronization page suggestion responsive to a triggering event and receives the suggestion.
Figure 6B:
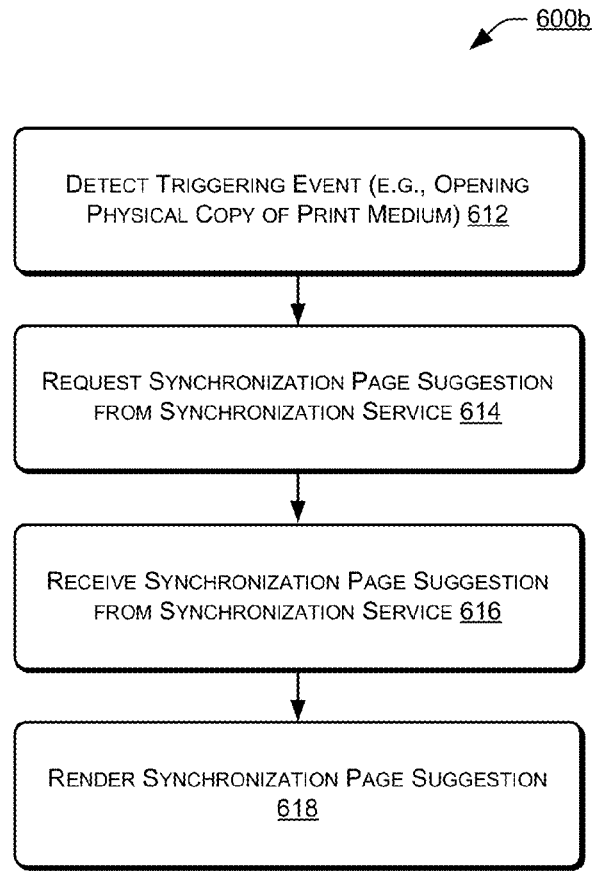

FIGS. 6a-6b illustrate example processes 600a and 600b of operations of the electronic bookmark 502. These processes 600a and 600b are described as sequences of operations. It is to be appreciated, however, that the processes 600a and 600b are merely representative of example implementations, and more or fewer operations may be performed by the same or different entities in different implementations. Further, the processes 600a and 600b can be implemented in hardware, software, or a combination thereof. For example, the processes 600a and 600b may be implemented at least partially by the synchronization module 516 described above. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 600a includes, at 602, capturing an image of a page of a physical copy of a print medium 102. The process 600a may capture the image responsive to closing or folding of the physical copy of the print medium 102 or responsive to an actuation of a control 504 of the electronic bookmark 502. In another embodiment, the capturing may be responsive to a change in directional orientation (e.g., moving the electronic bookmark 502 from a horizontal orientation to a vertical orientation).

At 604, the process 600a may optionally process the captured image to extract a page number 104. To extract the page number 104, the process 600 may first extract textual or visual indicia from the captured image. For example, the electronic bookmark 502 implementing process 600a may utilize Object Content Recognition (OCR) technology for recognizing text in images or any other techniques known in the art for extracting pictures or text from images. In one embodiment, the indicia may comprise sets of alphanumeric keys read backwards, as described in the above-cited Miyata et al.

The extracted textual or visual indicia are then used to determine a page number associated with the captured image of the page. For example, the process 600a may reference indicia associated with reading locations and page numbers, such as a subset of page-indicia mappings 216 received from the synchronization service 106. This subset of page-indicia mappings 216 may be associated with a set of electronic print media associated with the user of the electronic bookmark 502, with contacts of the user, and/or with social network friends of the user. This subset of page-indicia mappings 216 may also be associated with a reading history of that user, the contacts, and/or the social network friends. The process 600a may also receive the list of electronic print media and/or the reading history from the synchronization service 106. The process 600a may then attempt to match the extracted indicia against indicia associated with the subset of the page-indicia mappings 216. The page or reading location determined by the match is then used as the page number 104. If no match is found, the process 600a may revert to providing the image of the page in place of a page number 104.

In a further embodiment, the process 600a may utilize general or user-specific patterns, such as the general pattern of a user reading a book in a single direction, from front to back, to shorten the matching process.

At 606, the process 600a provides the captured image or derived page number 104 to the synchronization service 106. The process 600a may do so directly (e.g., through a satellite-based wireless network) or indirectly by first providing the captured image or derived page number 104 to a proximate electronic device 110. Along with the captured image or page number 104, the process 600a may provide an identifier associated with the electronic bookmark 502 to enable the synchronization service 106 to associate the captured image or page number 104 with a user account.

At 608, the process 600a receives a synchronization page suggestion 112 from the synchronization service 106. The synchronization page suggestion 112 may also be received directly from the synchronization service 106 or indirectly through a proximate electronic device 110. In some embodiments, such as those illustrated in FIG. 6b, a synchronization page suggestion 112 is received following a request for the synchronization page suggestion 112 from the electronic bookmark 502.

At 610, the process 600a renders the synchronization page suggestion 112 using, for example, the rendering mechanism 506. The user of the electronic bookmark 502 may then flip to the page specified by the synchronization page suggestion 112.

In process 600b, at 612, the electronic bookmark 502 detects the occurrence of a triggering event. Example triggering events may include the opening of the physical copy of the print medium that includes the electronic bookmark 502. Responsive to the triggering event, the process 600b provides, at 614, a request to the synchronization service 106 for a synchronization page suggestion 112.

At 616, the process 600b receives a synchronization page suggestion 112 from the synchronization service 106. The synchronization page suggestion 112 may also be received directly from the synchronization service 106 or indirectly through a proximate electronic device 110.

At 618, the process 600b renders the synchronization page suggestion 112 using, for example, the rendering mechanism 506. The user of the electronic bookmark 502 may then flip to the page specified by the synchronization page suggestion 112.

Example Electronic Device Architecture and Processes

Figure 7:
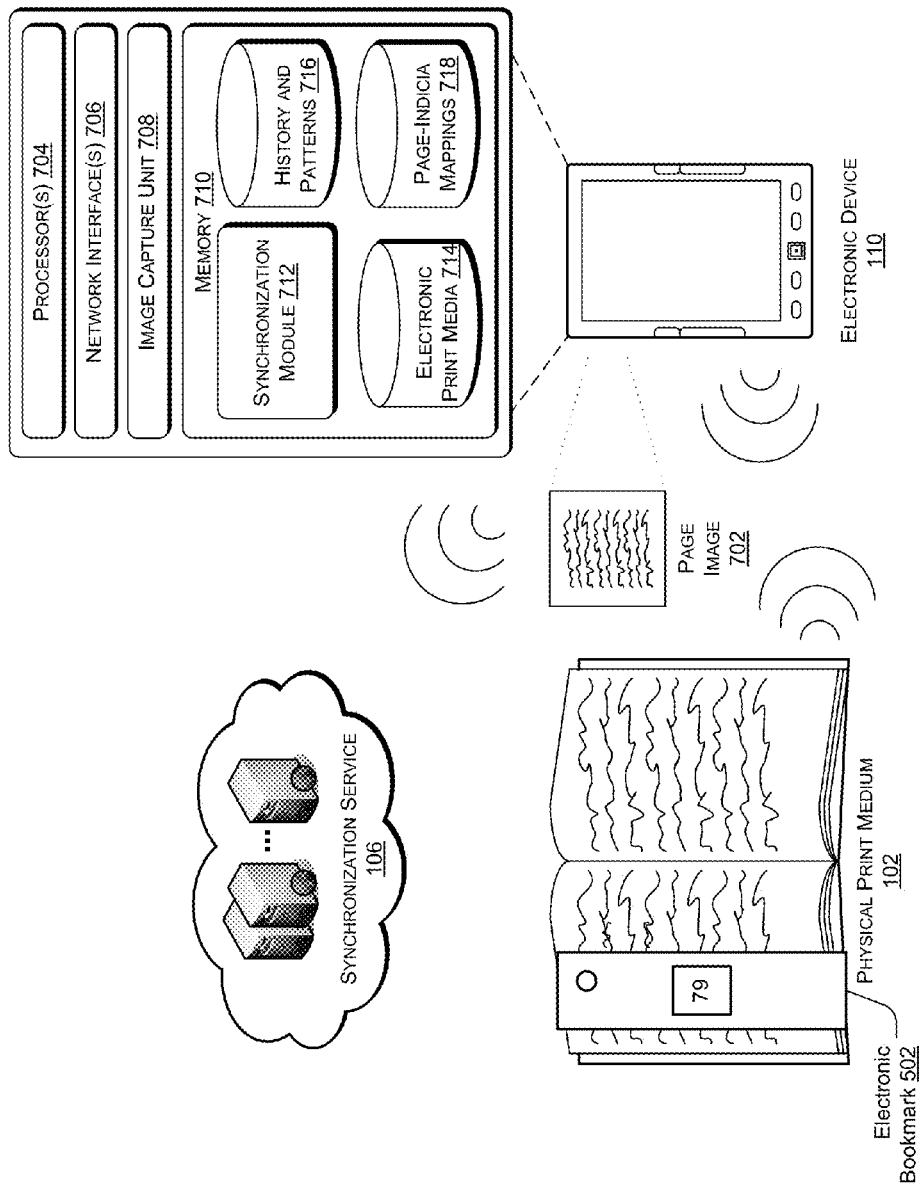
FIG. 7 illustrates an example environment including the synchronization service, a physical copy of a print medium, an electronic bookmark, and an electronic device, as well as an architecture of the electronic device.

FIG. 7 illustrates an example environment including the synchronization service, a physical copy of a print medium, an electronic bookmark, and an electronic device, as well as an architecture of the electronic device. As illustrated, an electronic bookmark 502 may be placed on a physical page of a physical copy of a print medium 102. The electronic bookmark 502 captures an image of the page and then provides either a page number 104 it has derived from the image or the image itself to the electronic device 110. In other embodiments, rather then utilizing an electronic bookmark 502 to capture an image of a page, the electronic device 110 may capture an image 702 of the page of the physical copy of the print medium 102. The electronic device 110 may be used for image capture if the electronic bookmark 502 is not available or if the user simply prefers to use the electronic device 110 for this purpose.

The electronic device 1110 than either provides the received image, captured image 702, or the received page number 104 to the synchronization service 106. In some embodiments, the electronic device 110 derives the page number 104 from the received image or the captured image 702. Responsive to receiving a page number 104 or page image, the synchronization service 106 provides a synchronization page suggestion 112 determined in the manner described above to the electronic device 110. Upon receiving the synchronization page suggestion 112, the electronic device 110 may render the synchronization page suggestion (e.g., via display or audio), may transmit the synchronization page suggestion 112 to the electronic bookmark 502 for rendering, and/or may update an electronic copy that corresponds to the physical copy of the print medium 102 to a reading location associated with the synchronization page suggestion 112. The rendering of the synchronization page suggestion 112 may enable a user of the physical copy of the print medium 102 to flip to a page corresponding to the synchronization page suggestion 112.

In various embodiments, the electronic device 110 is any sort of computing device. For example, the electronic device 110 may be an e-reading device, a smart phone or other cellular device, a personal digital assistant (PDA), a tablet computer, a personal computer (PC), a laptop computer, a desktop computer, a media player, a gaming device, or an electronic bookmark 502. The electronic device 110 may include a display surface, such as liquid crystal display (LCD), a light-emitting diode (LED) display, an electronic paper display, or any other type of display or combination of displays. The electronic device 110 may also include audio components, input components, and other components associated with computing devices. Each electronic device 110 may be associated with a specific user and may be tied to that user in account information 214 of the synchronization service 106.

As shown in FIG. 7, the electronic device 110 may include processor(s) 704, network interface(s) 706, an image capture unit 708, and a memory 710. The memory 710 includes a synchronization module 712, a set of electronic print media 714 associated with the user of the electronic device 110, history and patterns 716, and a subset of page-indicia mappings 718.

In some embodiments, the processor(s) 704 may be or include any sort of processing unit, such as a central processing unit (CPU) or a graphic processing unit (GPU). The network interface(s) 706 allow the electronic device 110 to communicate with electronic bookmark 502, the synchronization service 106, or other devices. The network interface(s) 706 may send and receive communications through wired networks, wireless networks, and combinations of wired and wireless networks. Further, the network(s) may include any one or combination of multiple different types of public or private networks (e.g., cable networks, the Internet, wireless networks, etc.). In some instances, the electronic device 110 communicates over the network using a secure protocol (e.g., https).

In some embodiments, the image capture unit 708 comprises any type camera or optics capable of capturing an image of a page. In various embodiments, the image captured by the image capture unit 708 may be a low resolution image or high resolution image. The image capture unit 708 may also include a lighting unit for creating a flash of light that aids in image capture.

The memory 710 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

As mentioned, the memory 710 includes a synchronization module 712. The synchronization module 712 may be any one or more applications, processes, threads, or functions configured to cause the image capture unit 708 to capture an image 702 and to provide, via the network interface(s) 706, that image 702 to the synchronization service 106. In some embodiments, the synchronization module 712 causes the image capture unit 708 to capture the image 702 responsive to user interaction and direction. In other embodiments, the synchronization module 712 receives an image or page number 104 from an electronic bookmark 502. Also, in some embodiments, the synchronization module 712 derives a page number 104 from the captured image 702 or received image and provides the page number 104 rather than the captured image 702 or received image. Further, the synchronization module 712 may receive from the synchronization service 106 a synchronization page suggestion 112 and may provide the synchronization page suggestion 112 to the electronic bookmark 502, may render the synchronization page suggestion 112, and/or may update a reading location of an electronic copy of the print medium based on the synchronization page suggestion 112. Additionally, the synchronization module 712 may determine a reading location of an electronic copy of the print medium and provide that electronic copy to the synchronization service 106 for synchronization. These capabilities of the synchronization module 712 are illustrated in the operations shown in FIGS. 8a-8b and 9 and are described further below with reference to those figures.

In some embodiments, the electronic print media 714 are copies of electronic print media that have been purchased or otherwise acquired by the user of the electronic device 110. The electronic print media 714 may include copies of all such purchased or acquired electronic print media or a downloaded subset of the purchased or acquired electronic print media. The electronic print media 714 may also include a list of electronic print media of contacts or social network friends of the user.

The history and patterns 716 may include a reading history of the user of the electronic device 110 and/or reading histories of contacts or social network friends of the user. The reading histories may be locally created based on reading activities of the user on the electronic device 110, remotely collected by the synchronization service 106 based on reading activities of the user and/or the contact/friends, or may be a combination of locally created and remotely collected data. The patterns may include general patterns (e.g., users reading print media in a single direction) or user-specific patterns (e.g., skipping chapters associated with a certain subject or category). The patterns may be preloaded on the electronic device 110, received from the synchronization service 106, or generated by the electronic device 110.

The page-indicia mappings 718 may be a subset of page-indicia mappings 216. The page-indicia mappings 718 may be associated with the electronic print media 714, the history and patterns 716, or both, and may be received from the synchronization service 106.

Figure 8A:
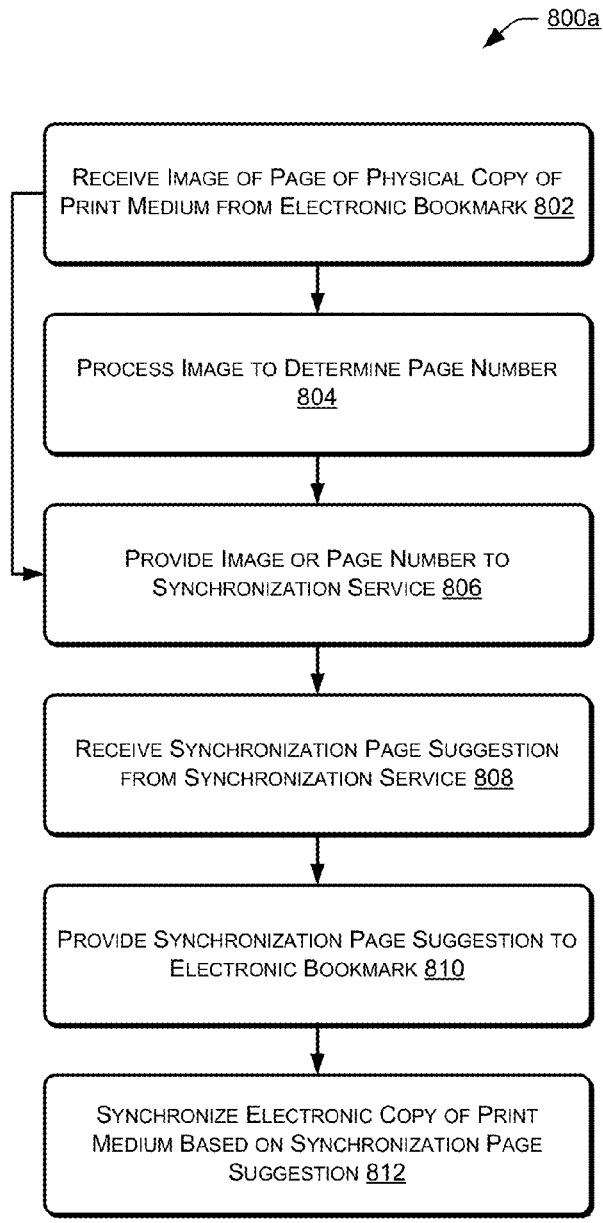
FIGS. 8a-8b illustrate example processes in which an electronic device receives an image of a page of a physical copy of a print medium from a proximate electronic bookmark and provides the image or a page number derived from the image to a synchronization service and in which an electronic device provides a reading location to a synchronization service, receives a synchronization page suggestion, and provides the synchronization page suggestion to the proximate electronic bookmark.
Figure 8B:
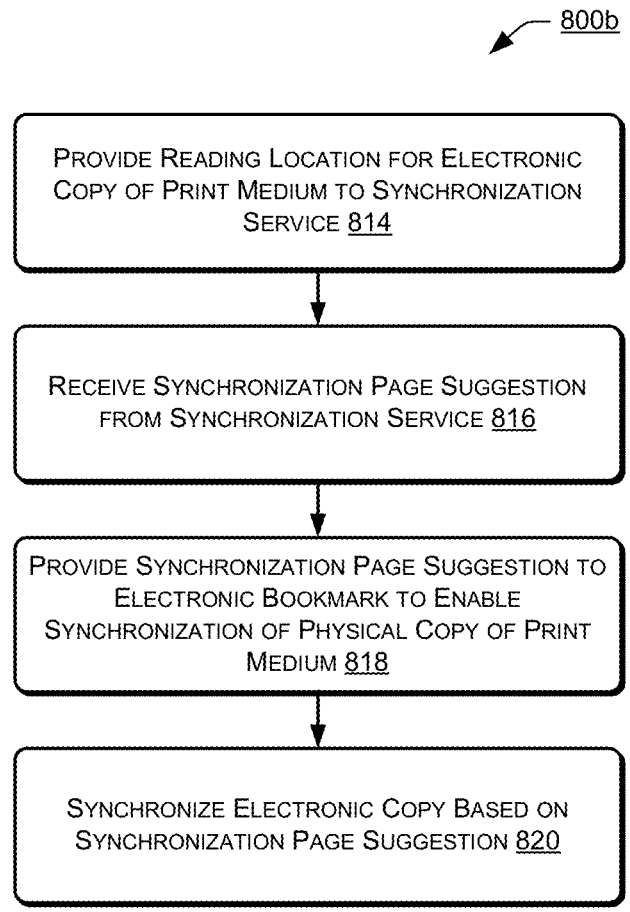
Figure 9:
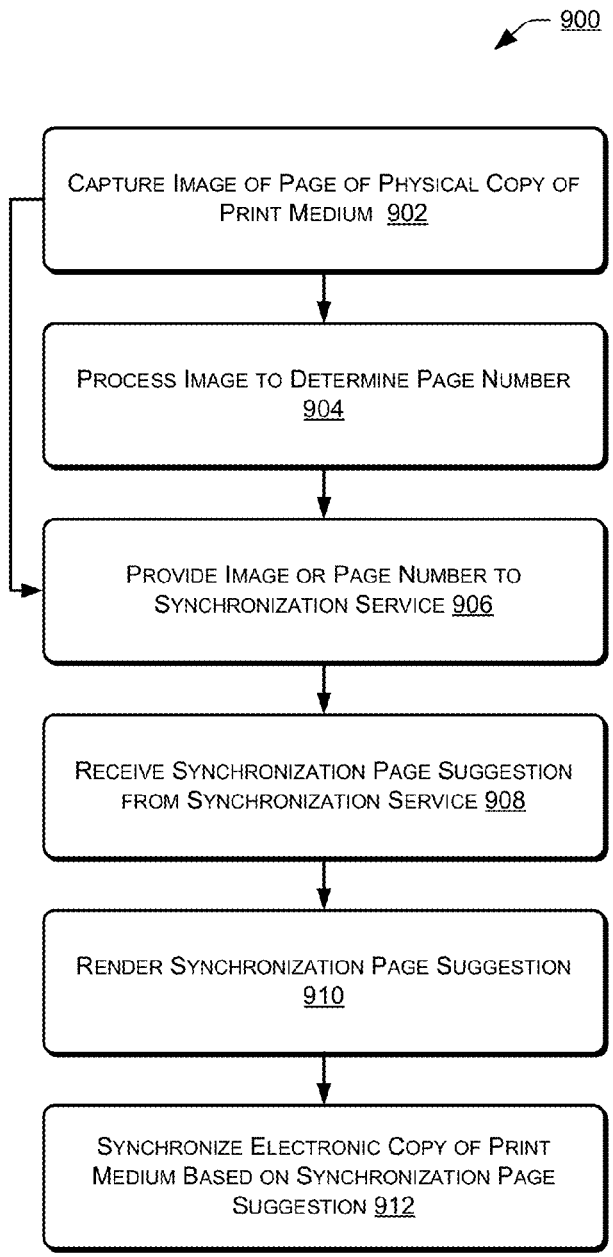
FIG. 9 illustrates an example process in which an electronic device captures an image of a page of a physical copy of a print medium and provides the image or a page number derived from the image to a synchronization service.

FIGS. 8a-8b and 9 illustrate example processes 800a, 800b and 900 of operations of the electronic device 110. These processes 800a, 800b and 900 are described as a sequence of operations. It is to be appreciated, however, that the processes 800a, 800b and 900 are merely representative example implementations, and more or fewer operations may be performed by the same or different entities in different implementations. Further, the processes 800a, 800b and 900 can be implemented in hardware, software, or a combination thereof. For example, the processes 800a, 800b and 900 may be implemented at least partially by the synchronization module 712 described above. In the context of software, the illustrated operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 800a includes, at 802, receiving an image of a page of a physical copy of a print medium 102 from an electronic bookmark 502. The image may be received though the network interface(s) 706 of the electronic device 110.

At 804, the process 800a may optionally process the captured image to extract a page number 104. To extract the page number 104, the process 800 may first extract textual or visual indicia from the captured image. For example, the electronic device 110 implementing process 800a may utilize Object Content Recognition (OCR) technology for recognizing text in images or any other techniques known in the art for extracting pictures or text from images. In one embodiment, the indicia may comprise sets of alphanumeric keys read backwards, as described in the above-cited Miyata et al.

The extracted textual or visual indicia are then used to determine a page number 104 associated with the captured image of the page. For example, the process 800a may reference indicia associated with reading locations and page numbers, such as page-indicia mappings 718. As mentioned, the page-indicia mappings 718 may be associated with a set of electronic print media 714 associated with the user of the electronic device 110, with contacts of the user, and/or with social network friends of the user. The page-indicia mappings 718 may also be associated with a set of electronic print media 714 associated with a reading history 716 of that user, the contacts, and/or the social network friends. The process 800a may then attempt to match the extracted indicia against indicia associated with the page-indicia mappings 718. The page or reading location determined by the match is then used as the page number 104. If no match is found, the process 800a may revert to providing the image of the page in place of a page number 104.

In a further embodiment, the process 800a may utilize general or user-specific patterns 716, such as the general pattern of a user reading a book in a single direction, from front to back, to shorten the matching process.

At 806, the process 800a provides the received image or derived page number 104 to the synchronization service 106. Along with the received image or page number 104, the process 800a may provide an identifier associated with the electronic device 110 to enable the synchronization service 106 to associate the image or page number 104 with a user account.

At 808, the process 800a receives a synchronization page suggestion 112 from the synchronization service 106 and at 810, the electronic device 110 provides the synchronization page suggestion 112 to the electronic bookmark to enable the electronic bookmark 502 to render the synchronization page suggestion 112. Also or instead, at 810, the electronic device may render the synchronization page suggestion 112 on display or audio components of the electronic device 110. The user of the electronic device 110 may then flip to the page specified by the synchronization page suggestion 112.

At 812, the process 800a synchronizes an electronic copy of the print medium based on the synchronization page suggestion 112, updating the reading location associated with the electronic copy.

In process 800b, at 814, the electronic device 110 provides a reading location for an electronic copy of a print medium. The electronic device 110 may provide the reading location periodically as the user of the electronic device 110 reads the electronic copy or in response to a user closing or changing display context from a reading application that had been rendering the electronic copy to a display of the electronic device 110.

At 816, the process 800b receives a synchronization page suggestion 112 from the synchronization service 106 and at 818, the electronic device 110 provides the synchronization page suggestion 112 to the electronic bookmark to enable the electronic bookmark 502 to render the synchronization page suggestion 112. Also or instead, at 818, the electronic device may render the synchronization page suggestion 112 on display or audio components of the electronic device 110. The user of the electronic device 110 may then flip to the page specified by the synchronization page suggestion 112.

At 820, the process 800b synchronizes an electronic copy of the print medium based on the synchronization page suggestion 112, updating the reading location associated with the electronic copy.

In process 900, rather then receiving an image of a page from an electronic bookmark 502, the electronic device 110 implementing the process 900 captures an image of the page. At 902, the process 900 captures an image of a page of a physical copy of a print medium 102 using the image capture unit 708 of the electronic device 110.

At blocks 904-912, the process 900 optionally processes the image to determine the page number 104, provides the image or page number 104 to the synchronization service 106, receive a synchronization page suggestion 112 from the synchronization service 106, render the synchronization page suggestion 112 on the electronic device 110, and synchronize an electronic copy of the print medium based on the synchronization page suggestion 112. The operations shown at blocks 904-908 and 912 are the same as those shown in blocks 804-808 and 812 and described above.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

We claim:

1. An electronic bookmark comprising:
a body having a bookmark form factor designed to fit between pages of a closed physical copy of a print medium, the body including:
a processor and memory, the memory storing instructions that when executed by the processor program the processor to perform operations comprising:
determining one or more indicia from an image of at least a portion of a page of the physical copy of the print medium;
determining a match between one or more indicia for an electronic copy of the print medium and the one or more indicia from the image of the at least a portion of the page; and
specifying page information comprising a physical page number corresponding to the image;
a network interface communicatively coupled to the processor;
an imaging unit communicatively coupled to the processor and configured to capture the image of the at least a portion of the page of the physical copy of the print medium; and
a synchronization module configured to be operated by the processor to receive the image from the imaging unit and to provide the image to a synchronization server via the network interface for synchronization between one or more reading locations associated with the image of the physical copy of the print medium and one or more reading locations of one or more electronic copies of the print medium.

2. The electronic bookmark of claim 1, wherein the imaging unit performs the capturing at least partly responsive to:
the physical copy of the print medium being closed;
the physical copy of the print medium being opened;
a change in a directional orientation of the electronic bookmark;
sensed motion of the electronic bookmark; or
a change in an environment of the electronic bookmark.

3. The electronic bookmark of claim 1, wherein the electronic bookmark captures the image when the electronic bookmark has a vertical directional orientation relative to the physical copy of the print medium and electronically highlights content of the print medium when the electronic bookmark has a horizontal directional orientation relative to the physical copy of the print medium.

4. The electronic bookmark of claim 3, wherein the body has one or more sensors along an edge for sensing movement along the one or more sensors, the detected movement used along with the captured image in performing electronic highlighting.

5. The electronic bookmark of claim 1, further comprising a control located on the body, wherein the imaging unit performs the capturing responsive to actuation of the control.

6. The electronic bookmark of claim 1, further comprising a rendering mechanism configured to render a synchronization page suggestion received from the synchronization server.

7. The electronic bookmark of claim 6, wherein the rendering mechanism is further configured to render a purchase suggestion received from the synchronization server.

8. The electronic bookmark of claim 1, further comprising one or more modules configured to be operated by the processor to identify a last read page upon placement of the electronic bookmark on a location on or within the physical copy of the print medium.

9. The electronic bookmark of claim 1, wherein the synchronization module receives a set of print media or a reading history, uses the set of print media or the reading history to derive a physical page number from the image, and provides an indication of the physical page number to the synchronization server.

10. A method comprising:
under control of one or more processors of an electronic bookmark designed to fit between pages of a closed print medium:
capturing, with an imaging unit of the electronic bookmark, an image of at least a portion of a page of a physical copy of a print medium; and
sending, over a network interface of the electronic bookmark, the image to a synchronization server to cause the synchronization server to synchronize one or more reading locations associated with the image of the at least a portion of the page and one or more reading locations associated with one or more electronic copies of the print medium;
receiving, from the synchronization server, one or more indicia for an electronic copy of the one or more electronic copies of the print medium;
determining one or more indicia from the image of the at least a portion of the page;
determining a match between the one or more indicia for the electronic copy of the one or more electronic copies of the print medium and the one or more indicia from the image of the at least part of the page of the print medium; and
specifying page information comprising a physical page number corresponding to the image.

11. The method of claim 10, further comprising:
receiving, from the synchronization server, directions for synchronizing the physical copy of the print medium with a reading location in an electronic copy of the print medium; and
displaying, on a display surface of the electronic bookmark, the directions for synchronizing the physical copy of the print medium with the reading location in the electronic copy of the print medium.

12. The method of claim 11,
wherein the capturing the image is in response to determining that the physical copy of the print medium has been opened; and
wherein the directions include a synchronization page.

13. The method of claim 10, further comprising:
determining, based on sensor input from a sensor of the electronic bookmark, a rotation of the electronic bookmark over content of the physical copy of the print medium; and
in response to determining the rotation, sending an indication to the synchronization server, wherein the indication indicates that the content includes highlighted content.

14. The method of claim 13, wherein the rotation of the electronic bookmark is from a vertical position to a horizontal position.

15. The method of claim 10, wherein the image is a first image, and wherein the method further comprises:
in response to an actuation of a control button of the electronic bookmark, capturing a second image from the physical copy of the print medium; and sending an indication to the synchronization server, wherein the indication indicates that the second image includes highlighted content.

16. The method of claim 10, wherein the image is a first image, and wherein the method further comprises:
   in response to an actuation of a touch sensitive surface on the electronic bookmark, capturing a second image from the physical copy of the print medium; and
   sending an indication to the synchronization server, wherein the indication indicates that the second image includes highlighted content.

17. The method of claim 10, further comprising:
   receiving, from the synchronization server, a purchase suggestion; and
   displaying, on a display surface of the electronic bookmark, the purchase suggestion.

18. The method of claim 11, wherein the directions include a number of pages to be turned for the physical copy of the print medium to be synchronized with the electronic copy of the print medium.

19. A non-transitory computer-readable storage medium storing computer instructions that, when executed by one or more processors of an electronic bookmark, perform:
   capturing, by the electronic bookmark in proximity to a first physical page of a physical copy of the print medium, a first image of at least a portion of the physical page; and
   sending, to a synchronization server, a first page number derived from the first image to a synchronization server to cause the synchronization server to synchronize one or more reading locations associated with the first image of the at least a portion of the page and one or more reading locations associated with one or more electronic copies of the print medium;
   receiving a synchronization page from the synchronization server; and
   causing directions to be displayed on the electronic bookmark for synchronizing the physical copy of the print medium with the one or more electronic copies of the print medium, wherein the directions indicate turning a number of pages of the physical copy of the print medium in a given direction, wherein the number of pages is based on a difference between the synchronization page and the first physical page.

20. The non-transitory computer-readable storage medium of claim 19, wherein the computer instructions that, when executed by one or more processors of an electronic bookmark, further perform:
   sensing, using one or more sensors of the electronic bookmark, that the physical copy of the print medium has been opened, wherein the capturing is in response to the sensing.

21. The non-transitory computer-readable storage medium of claim 19, wherein the image is a first image and the physical page is a first physical page, and wherein the computer instructions, when executed by the one or more processors of the electronic bookmark, further perform:
   in response to determining that the physical copy of the print medium has been closed, capturing a second image of at least a portion of a second physical page of the physical copy of the print medium; and
   sending the second image to the synchronization server.

22. The non-transitory computer-readable storage medium of claim 19, wherein the computer instructions, when executed by the one or more processors of the electronic bookmark, further perform:
   receiving, from the synchronization server, one or more page indicia mappings corresponding to the physical copy of the print medium; and
   deriving the first page number based at least partly on the one or more page indicia mappings.

23. The non-transitory computer-readable storage medium of claim 22, wherein the computer instructions, when executed by the one or more processors of the electronic bookmark, further perform:
   deriving one or more indicia from the first image of the first physical page;
   comparing the one or more indicia from the first image of the first physical page with the received one or more page indicia mappings; and
   deriving, based at least in part on the comparison, the first page number.

24. The non-transitory computer-readable storage medium of claim 23, wherein the one or more indicia derived from the first image of the first physical page comprise one or more visual or textual patterns.

* * * * *